(12) United States Patent
Dinges et al.

(10) Patent No.: US 7,337,017 B2
(45) Date of Patent: Feb. 26, 2008

(54) AUTOMATION SYSTEM WITH AFFECTIVE CONTROL

(75) Inventors: Clemens Dinges, Obermichelbach (DE); Matthias Ehrmann, Neuendettelsau (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 127 days.

(21) Appl. No.: 11/227,648

(22) Filed: Sep. 15, 2005

(65) Prior Publication Data

US 2006/0058895 A1 Mar. 16, 2006

(30) Foreign Application Priority Data

Sep. 16, 2004 (EP) .................. 04022105

(51) Int. Cl.
*G05B 11/01* (2006.01)
*G05B 9/02* (2006.01)

(52) U.S. Cl. .............. 700/18; 700/79; 700/21

(58) Field of Classification Search ........... 700/18, 700/23, 86, 80, 79, 93, 110, 21
See application file for complete search history.

(56) References Cited

U.S. PATENT DOCUMENTS

| | | | | |
|---|---|---|---|---|
| 5,485,590 A * | 1/1996 | Hyatt et al. | ........... | 711/115 |
| 5,801,942 A * | 9/1998 | Nixon et al. | ........... | 700/83 |
| 5,831,853 A * | 11/1998 | Bobrow et al. | ......... | 700/86 |
| 5,923,903 A * | 7/1999 | Alvarez-Escurra et al. | ... | 710/62 |
| 6,169,981 B1 * | 1/2001 | Werbos | ............ | 706/23 |
| 6,253,112 B1 * | 6/2001 | Flora-Holmquist et al. | ... | 700/19 |
| 6,581,048 B1 * | 6/2003 | Werbos | ............ | 706/23 |
| 6,754,560 B2 * | 6/2004 | Fujita et al. | ............ | 700/245 |
| 2004/0002790 A1 * | 1/2004 | Senn | ............ | 700/246 |
| 2004/0093118 A1 * | 5/2004 | Sabe et al. | ............ | 700/245 |
| 2004/0138959 A1 * | 7/2004 | Hlavac et al. | ............ | 705/26 |

FOREIGN PATENT DOCUMENTS

DE 198 57 683 A1 6/2000

OTHER PUBLICATIONS

Andrew Lee and Mohammed Ibrahim, "Emotional Attributes in Autonomic Computing Systems", Computer Society, Proceedings of the 14th International Workshop on Database and Expert Systems Applications (DEXA '03), Sep. 2003, pp. 681-685.
L. Custodio, R. Ventura and C. Pinto-Ferreira, "Artificial Emotions and Emotion-Based Control Systems", IEEE, Oct. 18, 1999, vol. 2, pp. 1415-1420.

* cited by examiner

*Primary Examiner*—Thomas K. Pham

(57) ABSTRACT

The invention relates to an automation system with a programmable controller (6), the programmable controller (6) exhibiting deterministic behavior and being provided to produce at least one first result value (13) from at least one first input value (3, 4, 5), as well as a method for controlling a technical process or a technical system with an automation system of this type. To improve the reaction of the automation system in situations for which no account is taken at the engineering stage, it is proposed that additional means for affective control (7) are provided which produce at least one state value (9) by means of situation evaluation means (8) from at least one second input value (1, 2) and for linking the state value (9) with an attribute profile (10) in order to form a second result value (11), the linkage means (14) being provided to link the first result value (13) to the second result value (11) in order to form at least one output value (15).

13 Claims, 2 Drawing Sheets

AUTOMATION SYSTEM WITH AFFECTIVE CONTROL

CROSS REFERENCE TO RELATED APPLICATIONS

This application claims priority to the European application No. 04022105.3, filed Sep. 16, 2004 and which is incorporated by reference herein in its entirety.

FIELD OF INVENTION

The invention relates to an automation system with a programmable controller, the programmable controller exhibiting deterministic behavior and being provided to produce at least one first result value from at least one first input value, as well as a method for controlling a technical process or a technical system with an automation system of this type.

SUMMARY OF THE INVENTION

Automation systems, in particular industrial automation systems, should operate reliably, safely and without endangering their environment. In the case of distributed automation solutions in particular, the complexity of automation systems is however increased, and thereby also the human requirements for controlling this complexity. This is particularly the case for the system management phase, in which the human can no longer reliably estimate the effect of an action triggered by a human on the behavior of the automation system completely and in relation to individual subsystems as a result of the interactions of the components of the automation system, and must therefore rely on the fact that, in automation systems in particular, preferably all potential faults and/or security risks are covered and controlled by the system. The aim here is preferably to eliminate the human as a potential safety risk. On the other hand, this 'elimination' presupposes that at the time when the system is engineered, all known and/or conceivable operating states and in particular error and malfunction situations can and must be explicitly described in the form of algorithms (e.g. in the form of control codes). In this case however, no account can be taken of unforeseen events and/or situations. The result of unforeseen events during the operation of the system has previously been that the automation system is unable to react correctly to such events and the human must intervene in the case of the above mentioned risk, with such risks occurring in a situation which is in itself unusual.

DE 198 57 683 A1 discloses an automation system, with which programmable controllers access decentral units by way of a bus system, said decentral units regulating, controlling or monitoring a process. In this case, the control devices are redundantly monitored using decentral periphery devices in relation to the safety-relevant processes and sequences. The control system and the safety device can be programmed and verified independently of one another.

The term controlling is used as a generic term below for regulating, controlling and/or monitoring.

The object underlying the invention is to improve the reaction of an automation system in situations for which no account is taken when the system is engineered.

This object is achieved by means of an automation system with a programmable controller, the programmable controller exhibiting deterministic behavior and being provided to produce at least one first result value from at least one first input value, thus providing means for affective control which are provided to produce at least one state value from at least one second input value by means of situation evaluation and are provided for linking the state value with an attribute profile to produce a second result value, with the linkage means being provided for linking the first result value with the second result value in order to form at least one output value.

This object is achieved by means of a method for controlling a technical process or a technical system, with which method a programmable controller of an automation system exhibiting a deterministic behavior is used to produced a first result value from at least one first input value is formed, with which a state value is produced from at least one second input value using means for affective control and the state value is linked, using situation evaluation means, with an attribute profile in order to produce a second result value, with which, by using connecting means, the first result value is connected to the second result value in order to produce at least one first output value.

Examinations by the neurologist Antonio Damasio show that emotions form the basis of the intelligent thinking. According to Damasio, emotions compromise not only the rational performance of the brain, but also the fundamental condition for the functioning of reason. Damasio presents the theory that all human experiences over the course of his/her upbringing are stored in an emotional experience memory. According to Damasio, this experience memory informs a physical signal system that helps the human in making his/her decision and that Damasio terms as a somatic marker. In the case of the idea of different action alternatives, the somatic markers thus issue a response determined by previous experiences which aid the human in the decision process in which they exclude at first all emotional non-portable action possibilities. The behavior of the human, in particular in difficult, dangerous or also unknown situations is thus determined by a combination of conscious and unconscious actions. The programming of an automation system is similar to a conscious action in the case of a human, wherein the automation developer determines the reaction to events and situations which can be provided at engineering time. The causality principle and thus also the strong deterministic behavior is the decisive factor here. The programmable controller is in this sense a conventional controller. According to the invention, the automation system is extended by an affective control, with which the automation system can react to unprogrammed situations. The affective controller corresponds to the unconscious action of the human. The automation system is thus extended by an additional 'unconscious' control component.

According to advantageous embodiments of the invention, the state value describes the characteristic of an emotion and represents the attribute profile attributes, in particular character attributes of the automation system. In other words, the unconscious action of the automation system is determined by an emotions model which is geared to the positive and/or negative affectivity of the human. Nevertheless the aim in this case is, as far as possible, not to precisely reproduce human behavior in an automation system—in the sense of an 'intelligent machine'—or to use the 'emotions' of the machine as the basis of the interaction with the operator, but instead to enable a classification of the respective state of the automation system into state spaces afflicted with 'emotions' by means of the automation system, by means of the emotion model and the algorithms attached thereto. The 'unconscious actions' assigned to this combination and dependent on the respective state space, the 'emotion' linked thereto and the respective attribute profile can be thus determined by the means for affective control in the form of the second result value.

The invention thus allows the automation system to also react in a reasonable manner in non-explicitly described operating states, without a human having to intervene.

According to a further advantageous embodiment of the invention, one or more second input values are identical to at least one and/or more first input values. With the situation evaluation of the affective control, a subset of the states and/or signals is determined, which are available to the conventional programmable controller as input values and are evaluated by means of the situation evaluation means.

The affective control advantageously uses means and methods of linear algebra. It is proposed that the input values, the state values, the result values and/or the output values can each be represented as vectors. According to further advantageous embodiments of the invention, the situation evaluation means are additionally implemented as situation evaluation matrices as well as the attribute profile being a presentable as an attribute matrix.

The affective controller is however not restricted to linear mappings, but the situation evaluation means and/or the attribute profile can instead also contain non-linear functions.

According to a further advantageous embodiment of the invention, the second result value can be superimposed onto the first result value to form the at least one output value. The unconscious actions thus modify the operating mode of the conscious actions and/or replace the latter, in particular if this cannot be determined, since for example no account of the relevant situation has been taken when the system was engineered.

According to a further advantageous embodiment of the invention, the means for affective control thus serve to monitor the programmable controller.

As rational behavior is heavily dependent on the individual definition, e.g. of the system operator, it is proposed that different behavior characters can be assigned to the automation system. Thus according to a further advantageous embodiment of the invention, the attribute profile can be adjusted using an engineering system and can be influenced by means of a learning process. In addition, it is proposed that the attribute profile can be stored and can be transmitted to other automation systems.

According to a further advantageous embodiment of the invention, a system with a number of interactive automation systems a proposed, with at least one part of the automation systems featuring different attribute profiles. Thus for example, a group can be formed in systems with a number of automation systems having different character matrices. A group of this type made of automation systems functions best if it has a balanced character distribution. An engineering system could ensure this balance by the distribution of different expanding character matrices on the automation systems.

The invention is described below in more detail with reference to the exemplary embodiments illustrated in the figures.

DETAILED DESCRIPTION OF THE INVENTION

Figure 1:
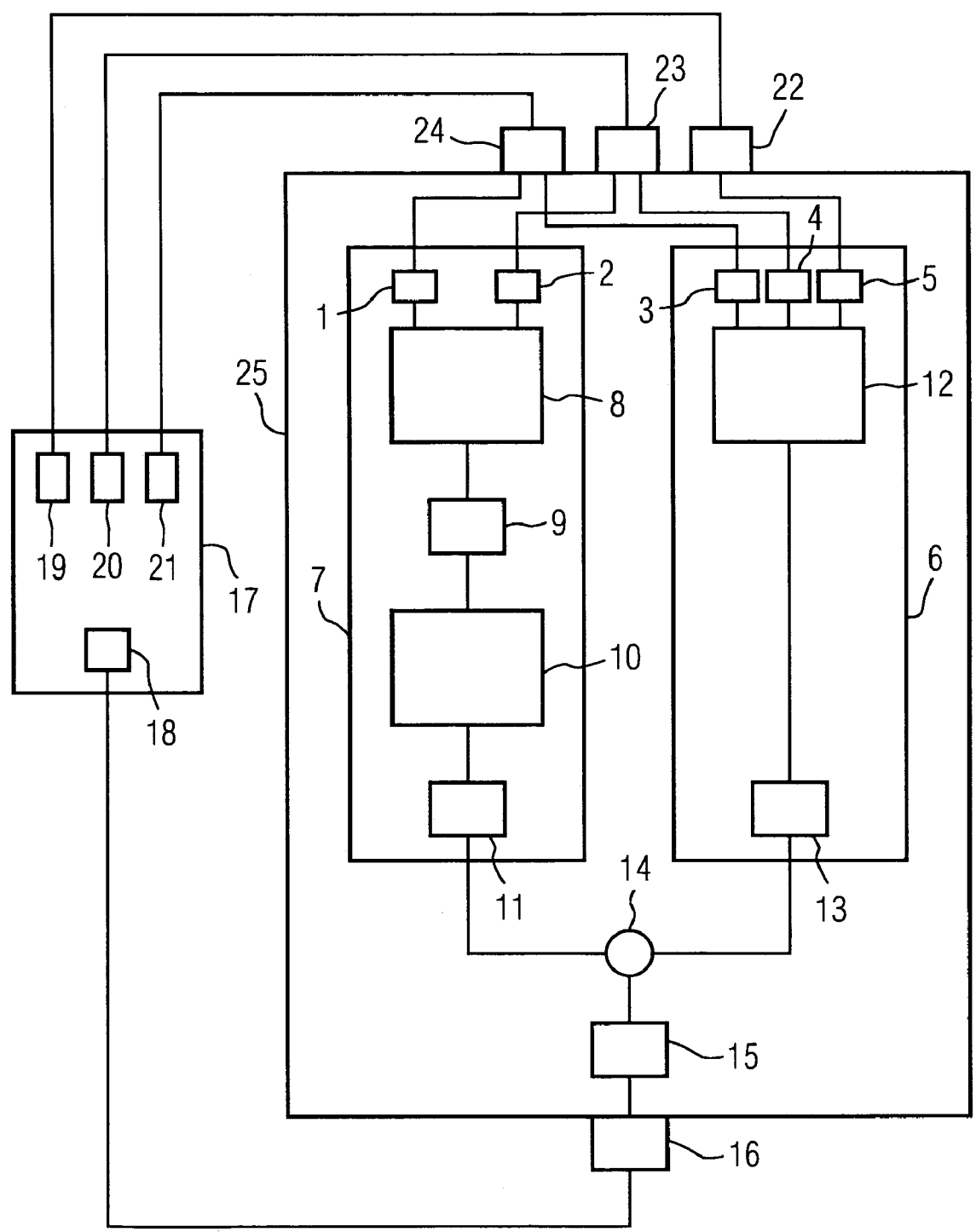
FIG. 1 shows an automation system with a programmable controller and means for affective control.

FIG. 1 shows an automation system 25 with a programmable controller 6 and means for affective control 7. The automation system serves to automate a technical process or a technical system 17. Process signals 19, 20, 21, are read into the automation system via interfaces 22, 23, 24. The read-in signals are available, at least partially, to the programmable controller 6 as first input values 3, 4, 5 and the means for affective control 7 as second input values 1, 2. The conventional programmable controller 6 processes the first input values 3, 4, 5 using a control program 12 and forms a first result value 13. The means for affective control 7 form a state value 9 using the situation evaluation means 8 from the second input values 1, 2. The state value is then connected to an attribute profile 10 by the means for affective control 7, so that a second result value 11 is formed. The linkage means 14 of the automation system 25 connect the first result value 13 and the second result value 11 to form an output value 15. The output value 15 is made available as a signal 18 via an interface 16 of the automation device 25 for controlling and/or regulating the technical process and/or the system 17.

Figure 2:
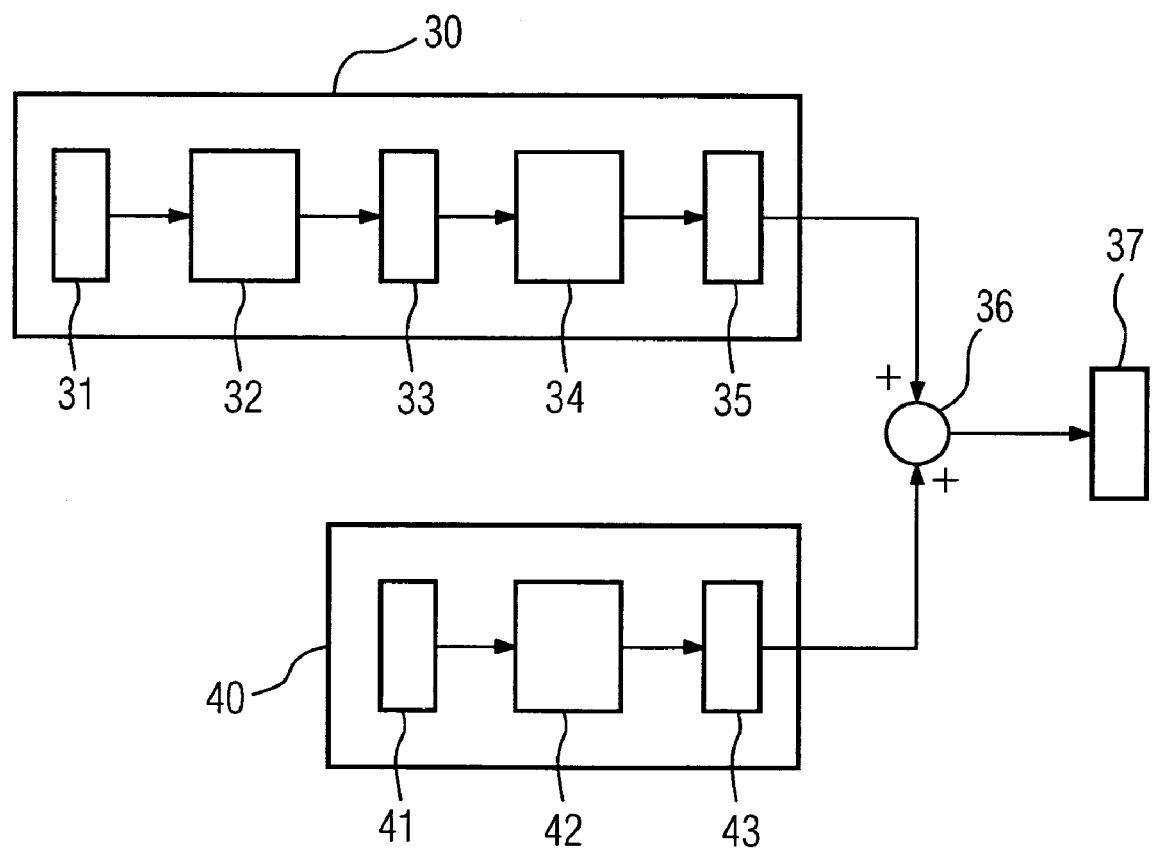
FIG. 2 shows a system of this type, which uses means of linear algebra.

FIG. 2 shows an exemplary embodiment for an automation system with means for affective control 30 as well as a conventional programmable controller 40, the input values, the state values, the result values, the output values, the situation evaluation means and the attribute profile being described with the means of linear algebra. The output value is in this case shown as an action vector 37. The result values of the programmable controller 40 and/or the means for affective control 30 are shown as action vectors 43 and/or 35. The action vector 37 (vector y) is in this case determined not only by the programmable controller 40 with its action vector 43 (vector $y_r$) but also by the output signal of the means for affective control 30, the action vector 35 (vector $y_a$).

$$y = y_r + y_a \qquad (1)$$

An emotion model is thus introduced into the automation system. The emotion model relates to the basis of an evaluation based for instance on an evaluation in terms of experience of currently measured control statues. This gives rise to the possibility of modifying and/or expanding static causal chains by means of defining attribute profiles in an operator-specific and state-specific manner, in particular in system states for which no actions were determined in engineering. An attribute profile of this type is referred to as a character-specific action profile or as a character profile. The 'machine emotions' are further processed with the aid of this profile to an affective parameter, which exclusively influences the conventional control behavior and/or is superimposed thereon.

The conventional programmable controller 40 corresponds to the conscious action. The input values are mapped as input variable vectors 41 (vector u) on the action vector 43 (vector $y_r$) via a control program reproducing a characteristic control program matrix 42 (matrix P);

$$y_r = P \cdot u \qquad (2)$$

The means for affective control 7 extend the automation system by an unconscious action component. An integral part is in this case the state value 9, which is configured here as an emotion vector 33 (vector f). The emotion vector 33 is formed by means of a situation evaluation and is implemented here by means of the attribute profile as a character matrix 34 (matrix C) and formed on the unconscious action vector (vector $y_a$). In this case, the elements of the emotion vector 33 generated by the evaluation can be based on human emotions such as fear or happiness or can also be abstract parameters of a machine emotion. Each element $f_i$ of the emotion vector 33 can represent a characteristic of an emotion (fear, happiness etc), e.g. expressed as a percentage rate. The situation evaluation determines the emotion vector 32 (vector f) from the input values, those which are present here as situation vectors 31 (vector $u_s$), and via the situation evaluation means, which are present here as situation evaluation matrix 32 (matrix S):

$$f = S \cdot u_s \quad (3)$$

The character matrix 34 (matrix C) describes the type of automation system. For example, fearful or brash automation systems can be incorporated into a system. The character of an automation system could be explicitly stored (cf. a human gene) or can be produced in the system by educating and/or experiencing the system, (cf. mobbing, sense of achievement). With explicit storage, the character matrix 34 is stored in an engineering tool for example.

The character matrix 34 is not time-invariant during the learning process, but can adapt to the situation vector 31 during the control operation, e.g. in a feedback loop of the action vector 37. The learning experience of this automation system is stored in the character matrix 34. The experience can be passed to other automation systems by storing the character matrix 34. The individual learning success of an automation system can be reproduced in this way (see reproduction of memes).

Examples for experience and/or training could be:

A controller starts in a machine with a default parameterization. During the operation, the controller adapts its parameters according to the feedback of the sensors of the machine so as to optimize (experience) the manufacturing.

A user runs through different scenarios by means of the human-machine interfaces with a controller, so as to optimize the manufacturing process (training by humans).

A special computer with optimization algorithms is temporarily connected to a manufacturing cell in order to run through different optimization scenarios (training through the machine).

The unconscious actions of an automation system, represented as action vector 35 (vector $y_a$), are formed from the emotion vector 33 (vector f) via the character matrix 34 (matrix C):

$$y_a = C \cdot f \quad (4)$$

The action vector 35 formed by the means for affective control 30 is linked to the action vector 43 with linkage means 36 for action vector 37 formed by the classical programmable controller 40. The action vector 37 represents the output signal of the automation system.

The unconscious control component is thus implemented by a regulation structure. In this regulation, a situation detection and evaluation influences the unconscious states (=emotions) of the controller and the affective control actions resulting therefrom. Character-specific action profiles are introduced via a character matrix. The unconscious actions are superimposed onto the conscious actions of the conventional control process. Means and methods from the surroundings of the so-called organic computing and affective computing are applied for example.

The exemplary embodiment according to FIG. 2 is to be explained below in further detail with the concrete exemplary values.

The content of the emotion vector 32 (vector f) is defined as follows:

$$f = \begin{bmatrix} f_{Fear} \\ f_{Happiness} \\ f_{Danger} \end{bmatrix} \quad (5)$$

The emotion vector 22 thus represents the characteristic of the emotions fear, danger and happiness. Each of these emotions is represented by a scalar, which can assume for instance a value between 0 and 100%. This means that at one specific time, the controller could for example experience 30% fear, 50% danger and 10% happiness. In this example, human terms describing emotions such as fear or happiness are applied to the machine in order to simplify the emotion engineering. The emotion vector 33 could also contain abstract machine emotions which do not correspond with human emotions. These emotions would then additionally serve to place special emphasis on the transmission of the situative evaluation through the evaluation matrix 32 to the unconscious action vector 35. Danger is to serve here as an example for a more abstract emotion of this type (danger is not an emotion for a human, but rather a situation).

In the next step, the elements of the situation vector 31 (vector $u_s$) are determined. The situation vector 31 determines which input values are available to the affective control in order to generate the emotions in the emotion vector 33 (vector f). A human has a universal sensory instrument, such as eyes or ears, from which he can derive the most varied special information by means of preprocessing. A machine generally possesses specialized sensors, e.g. for temperature detection or for counting the number of units or other input values such as a unit specification for instance:

$$u_s = \begin{bmatrix} u_{Temperature} \\ u_{Actual\_Number\_of\_Units} \\ u_{Unit\_specification} \end{bmatrix} \quad (6)$$

In the exemplary embodiment, the emotion vector (vector f) is formed from these input vectors 31 by means of the situation evaluation matrix 32 (matrix S).

$$S = \begin{bmatrix} 2 & -3 & 2 \\ 0 & 10 & 2 \\ 10 & 0 & 0 \end{bmatrix} \quad (7)$$

$$f = \begin{bmatrix} f_{Fear} \\ f_{Happiness} \\ f_{Danger} \end{bmatrix} \quad (8)$$

$$= S \cdot u_s$$

$$= \begin{bmatrix} 2 & -6 & 5 \\ 0 & 10 & 2 \\ 10 & 0 & 0 \end{bmatrix} \cdot \begin{bmatrix} u_{Temperature} \\ u_{Actual\_Number\_of\_Units} \\ u_{Unit\_specification} \end{bmatrix}$$

The first line of the situation evaluation matrix evaluates the relevance of the input values for the scalar representing fear;

$$f_{Fear}=2\cdot u_{Temperature}-6\cdot u_{Actual\_Number\_of\_Units}+5\cdot u_{Unit\_Specification} \quad (9)$$

The higher the actual number of units, the more the fear of this controller reduces, the higher the unit specification, the more the fear of this controller increases, and an increased temperature also generates a small amount of fear. In the case of happiness, the actual number of units is weighted particularly high, with a dangerously high temperature.

As a reaction to the emotion state, the control can influence the machine via the unconscious action vector (vector $y_a$):

$$y_a = \begin{bmatrix} y_{Cooling} \\ y_{Rotational\_Speed} \end{bmatrix} \quad (10)$$

In this example, the machine unconsciously controls the cooling and the rotational speed via the character matrix:

$$C = \begin{bmatrix} 5 & -1 & 2 \\ -2 & 6 & -3 \end{bmatrix} \quad (11)$$

This results in a mapping function:

$$y_a = \begin{bmatrix} y_{Cooling} \\ y_{Rotational\_Speed} \end{bmatrix}$$
$$= C \cdot f$$
$$= \begin{bmatrix} 5 & -1 & 2 \\ -2 & 6 & -3 \end{bmatrix}$$
$$= \begin{bmatrix} f_{Fear} \\ f_{Happiness} \\ f_{Danger} \end{bmatrix} \quad (12)$$

With this control, the high percentage of fear with the transmission to cooling results for example in a slightly irrational behavior during fear.

$$y_{Cooling}=5\cdot f_{Fear}-f_{Happiness}+2\cdot f_{Danger} \quad (13)$$

The application example was described for linear system behavior. Similarly, the situation evaluation and the character matrix can represent non-linear functions.

In an application example (not shown) a system with a number of interactive automation systems is implemented, at least one part of the automation system comprising different attribute profiles. In this case, a number of automation systems with different character matrices form a group, this group having a weighted character distribution, since different complementary character matrices are distributed onto the automation system. A group is further developed as an entity by a group trainer. That could be an automation system for instance which is permanently or temporarily assigned to a group and assumes this role. An operator can similarly assume this role.

To summarize, the invention thus relates to an automation system with a programmable controller 6, the programmable controller 6 exhibiting deterministic behavior and being provided to produce at least at least one first result value 13 from at least one first input value 3, 4, 5, as well as a method for controlling a technical process or a technical system with an automation system of this type. To improve the reaction of the automation system in situations for which no account was taken at the engineering stage, it is proposed that additional means for affective control 7 are provided, which are provided to produce one state value 9 from at least one second input value 1, 2 by means of situation evaluation 8 and in order to link the state value 9 with an attribute profile 10 for forming a second result value 11, the linkage means 14 being provided in order to link the first result value 13 to the second result value 11 in order to form at least one output value 15.

The invention further comprises advantageous embodiments regarding a method for controlling a technical process or a technical system:

A method for controlling a technical process or a technical system, wherein the situation evaluation means are implemented as situation evaluation matrices (32).

A method for controlling a technical process or a technical system, wherein the attribute profile is represented as an attribute matrix (34).

A method for controlling a technical process or a technical system, wherein the situation evaluation means (8) and/or the attribute profile (10) contain non-linear functions.

A method for controlling a technical process or a technical system, wherein the second result value (11, 35) is superimposed onto the first result value (13, 43) in order to form the at least one output value (15, 37).

A method for controlling a technical process or a technical system, wherein the means for affective control (7) monitor the programmable controller (6).

A method for controlling a technical process or a technical system, wherein the attribute profile (10) is created with an engineering system.

A method for controlling a technical process or a technical system, wherein the attribute profile (10) is influenced by a learning process.

A method for controlling a technical process or a technical system, wherein the attribute profile (10) is stored and transmitted to other automation systems.

The invention claimed is:

1. An automation system for controlling a technical system in the presence of an unpredictable situation that can arise in connection with the operation of the technical system, the automation system comprising:

at least one sensor coupled to the technical system for sensing at least one signal generated during operation of the technical system;

a programmable controller, the programmable controller programmed with a predetermined deterministic behavior of the technical system, the controller being configured to generate based on the predetermined deterministic behavior of the technical system at least one first result value in response to at least one signal sensed by said at least one sensor, wherein the first result value is indicative of a predictable situation in connection with the operation of the technical system;

control means comprising an affective controller for generating at least one state value, the control means comprising an attribute profile comprising one or more emotions attributed to the affective controller, the attribute profile configured to process said at least one state value to generate a second result value influenced by the emotions attributed to the affective controller, the control means further comprising a situation evaluation means configured to determine said at least one state value in response to at least one signal sensed by said at least one sensor, wherein the at least one state value determined by the situation evaluation means is indicative of an unpredictable situation in connection with the operation of the technical system;

combining means for combining the first result value with the second result value to generate a control signal for regulating the technical system, wherein the control signal is influenced by the emotions imparted by the attribute profile to act when the unpredictable situation occurs in connection with the operation of the technical system; and a control interface for connecting the control signal to the technical system, said interface being part of a feedback loop for regulating the technical system in the presence of the unpredictable situation arising in connection with the operation of the technical system.

2. The automation system according to claim 1, wherein the at least one signal used to generate the at least one value indicative of the unpredictable situation is identical to at least one signal used to generate the at least one first result indicative of the predictable situation.

3. The automation system according to claim 1, wherein the at least one signal sensed by said at least one sensor, the state values, the result values, and/or the control signal comprises respective vectors.

4. The automation system according to claim 1, wherein the situation evaluation means comprises one or more situation evaluation matrices.

5. The automation system according to claim 1, wherein the attribute profile comprises an attribute matrix.

6. The automation system according to claim 1, wherein the situation evaluation means and/or the attribute profile comprise non-linear functions.

7. The automation system according to claim 1, wherein the second result value is superimposed onto the first result value to form the control signal.

8. The automation system according to claim 1, wherein the control means serve to monitor the programmable controller.

9. The automation system according to claim 1, wherein the attribute profile is derived from an engineering system.

10. The automation system according to claim 1, wherein the attribute profile is influenced by a learning process.

11. The automation system according to claim 1, wherein the attribute profile is stored and transmitted to other automation systems.

12. A system comprising a plurality of automation systems according to claim 1, wherein the automation systems interact together, and wherein at least one part of each automation system has different characteristic profiles.

13. A method for controlling a technical system in the presence of an unpredictable situation that can arise in connection with the operation of the technical system, the method comprising:

sensing at least one signal generated during operation of the technical system;

generating based on a predetermined deterministic behavior of the technical system at least one first result value in response to at least one signal obtained through said sensing, wherein the first result value is indicative of a predictable situation in connection with the operation of the technical system;

generating at least one state value;

providing an attribute profile comprising one or more emotions attributed to an affective controller, the attribute profile configured to process said at least one state value to generate a second result value influenced by the emotions attributed to the affective controller;

providing a situation evaluation means configured to determine said at least one state value In response to at least one signal obtained through said sensing, wherein the at least one state value is indicative of an unpredictable situation in connection with the operation of the technical system;

combining the first result value with the second result value to generate a control signal for regulating the technical system, wherein the control signal is influenced by the emotions imparted by the attribute profile to act when the unpredictable situation occurs in Connection with the operation of the technical system; and connecting the control signal to the technical system through a feedback loop for regulating the technical system in the presence of the unpredictable situation arising in connection with the operation of the technical system.

* * * * *